(12) United States Patent
Kitoh et al.

(10) Patent No.: US 7,594,559 B2
(45) Date of Patent: Sep. 29, 2009

(54) SUB-FRAME CONNECTING STRUCTURE

(75) Inventors: Tohru Kitoh, Machida (JP); Toru Kurokawa, West Bloomfield, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 529 days.

(21) Appl. No.: 11/399,756

(22) Filed: Apr. 7, 2006

(65) Prior Publication Data
US 2006/0255625 A1  Nov. 16, 2006

(30) Foreign Application Priority Data

| Apr. 8, 2005 | (JP) | ............................ 2005-112184 |
| Apr. 8, 2005 | (JP) | ............................ 2005-112187 |

(51) Int. Cl.
  *B62D 21/15* (2006.01)
(52) U.S. Cl. ...................... 180/232; 180/312; 180/274; 280/124.109; 280/784; 296/187.09; 403/71; 267/293
(58) Field of Classification Search ................ 180/232, 180/274, 311, 312; 280/124.109, 784, 785; 296/187.03, 187.09, 187.11, 204; 267/292–294, 267/140.12, 140.13; 403/71, 76, 77.365
See application file for complete search history.

(56) References Cited

U.S. PATENT DOCUMENTS

| 3,512,800 A | * | 5/1970 | Winsen ....................... 280/788 |
| 4,650,209 A | * | 3/1987 | Sumimoto ............ 280/124.109 |
| 4,723,791 A | * | 2/1988 | Miura et al. .......... 280/124.109 |
| 5,947,455 A | * | 9/1999 | Mikasa et al. .......... 267/140.13 |
| 6,997,276 B2 | * | 2/2006 | Yoshida et al. ............... 180/232 |
| 7,213,873 B2 | * | 5/2007 | Murata et al. ................ 296/204 |
| 2005/0189788 A1 | * | 9/2005 | Cornell et al. .......... 296/187.09 |

FOREIGN PATENT DOCUMENTS

| DE | 10301910 B3 | 6/2004 |
| GB | 2392653 A | 3/2004 |
| JP | H10-264862 A | 10/1998 |
| JP | 2001-001940 A | 1/2001 |
| JP | 2002-160663 A | 6/2002 |
| JP | 2003-246276 A | 9/2003 |

* cited by examiner

*Primary Examiner*—Ruth Ilan
(74) *Attorney, Agent, or Firm*—Global IP Counselors, LLP (57) ABSTRACT

An engine support structure improves energy absorbing efficiency at the vehicle body frame in relation to impact input from the vehicle front to rear direction. The support structure includes a vehicle body frame having front frame side members extending in the front to rear direction of the vehicle, a sub-frame disposed below the vehicle body frame and that supports the engine, and connecting members that connect the front frame side members and sub-frame. A suspension device for an automobile prevents insecure tightening. A support member which connects a body vehicle side member and sub-frame is provided with an outer tubular member connected to the sub-frame and that extends in the upper to lower direction, an inner tubular member mated into the upper portion of outer tubular member, and an insulator mated into inner tubular member and whose length in the upper to lower direction is shorter than outer tubular member.

19 Claims, 6 Drawing Sheets

SUB-FRAME CONNECTING STRUCTURE

CROSS-REFERENCE TO RELATED APPLICATIONS

The present application claims priority under 35 U.S.C. § 119 of Japanese Application Nos. 2005-112187, filed on Apr. 8, 2005, and 2005-112184, also filed on Apr. 8, 2005, the entire contents of which are expressly incorporated by reference herein.

FIELD

The present invention pertains to a support structure that supports an engine, motor, arm member of a suspension, or transmission, and in particular to an engine support structure that absorbs energy at the vehicle body frame when a collision occurs in the front to rear direction of the vehicle.

The present invention also pertains to a suspension device for an automobile and in particular to the structure of the connecting portion for connecting a vehicle body and a sub-frame.

BACKGROUND

Figure 4A:
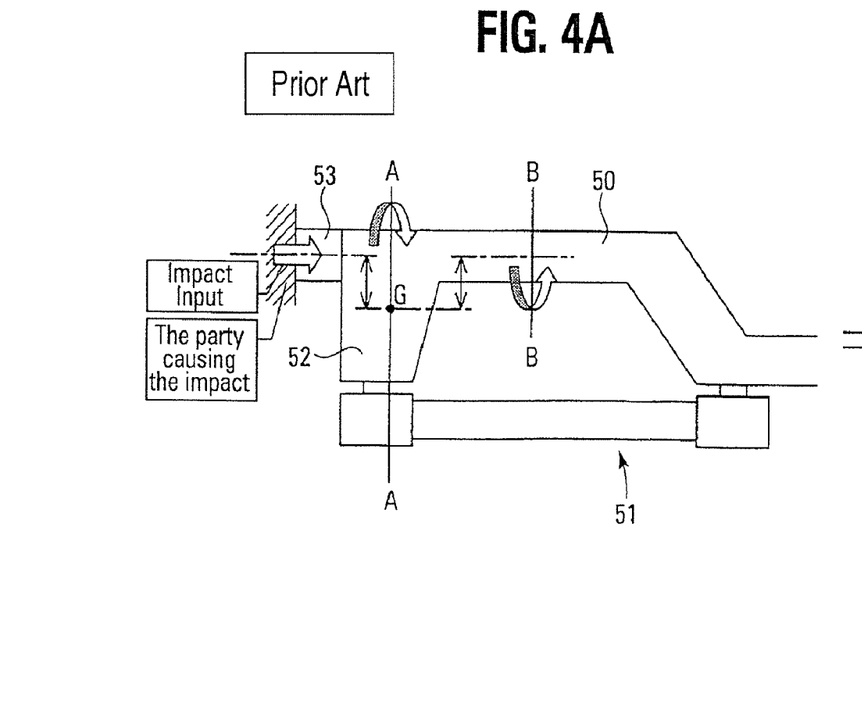

An example of a conventional engine support structure is described in Unexamined Japanese Patent Application Publication No. 2002-160663, Vehicle Body Front Portion Structure. For the structure described in Unexamined Japanese Patent Application Publication No. 2002-160663, as shown in FIG. 4 (a), sub-frame 51 is disposed below vehicle body front frame member 50, which extends in the front to rear direction of the vehicle, so that a predetermined distance is formed above and below said vehicle body front frame member 50 and so that it extends in the front to rear direction of the vehicle, and the front end of aforementioned vehicle body front frame member 50 and the front end of sub-frame 51 are connected by means of connecting member 52, which extends in the upper to lower direction. In addition, the engine is loaded onto aforementioned sub-frame 51.

Therefore, when a predetermined load or more is input from the front of the vehicle toward the rear due to a collision, a means is devised to increase the energy absorbing efficiency of this input load by collapsing and deforming the aforementioned vehicle body front frame member 50.

Conventionally, as cited in Unexamined Japanese Patent Application Publication No. 2003-246276, for example, the vehicle body and sub-frame are connected via a supporting elastic body, such as an insulator for absorbing the vibration, and a spacer for filling the space that is formed between the vehicle body and the sub-frame.

For the technology disclosed in aforementioned Unexamined Japanese Patent Application Publication No. 2003-246276, a spacer is disposed between the vehicle body and the sub-frame into which an insulator has been inserted. This spacer and insulator are securely tightened to the vehicle body by means of a bolt that penetrates in the upper to lower direction through the bottom of the sub-frame. In addition, below the insulator and sub-frame is disposed a stopper for preventing the sub-frame from falling out due to breakage caused by deterioration of the insulator over time.

SUMMARY

In order to achieve the aforementioned objective, the present invention pertains to an engine support structure equipped with a vehicle body frame that has an extending portion that extends in the front to rear direction of the vehicle, a sub-frame that supports the engine and that is disposed below the vehicle body frame, and a connecting member that connects the aforementioned extending portion and the sub-frame; wherein said engine support structure is characterized in that the restraining force in the rotational direction, whose axis is in the horizontal direction of the vehicle, is smaller at the portion that connects the extending portion and the connecting member than at the portion that connects the sub-frame and the connecting member.

Further, in order to solve the aforementioned problems, the automobile suspension device for the present invention is a suspension device that has a sub-frame disposed below a vehicle body side member, wherein said vehicle body side member and said sub-frame are connected by means of a support member that extends in the upper to lower direction; and said support member is provided with a tubular member that is connected to the aforementioned sub-frame and extends upward and a supporting elastic body that is inserted into the upper part of said tubular member and whose up and down length is shorter than said tubular member; and wherein said supporting elastic body is securely tightened to the vehicle body side member by a bolt that penetrates up and down through said supporting elastic body.

BRIEF DESCRIPTION OF DRAWINGS

FIGS. 1(a) and 1(b) are side views of a type diagram showing the engine support structure pertaining to the embodiment for the present invention, where FIG. 1(a) is the condition for before deformation takes place and FIG. 1(b) is the condition for after deformation takes place.

FIGS. 4(a) and 4(b) are side views of a type diagram explaining the conventional engine support structure, where FIG. 4(a) is the condition for before deformation takes place and FIG. 4(b) is the condition for after deformation takes place.

DETAILED DESCRIPTION

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The impact input from when a collision occurs operates on vehicle body frame member 50 via bumper 53. In order to reduce the deformation of the interior compartment of the vehicle in terms of protecting the passengers, it is desirable to efficiently absorb the impact input energy by deforming vehicle body frame member 50 at either the front or rear end in the front to rear direction of the vehicle, rather than deforming the interior compartment. The deformation mode that allows for the most efficient impact input energy absorption by vehicle body frame member 50 is a mode in which compression deformation occurs in the axial direction.

Figure 4B:
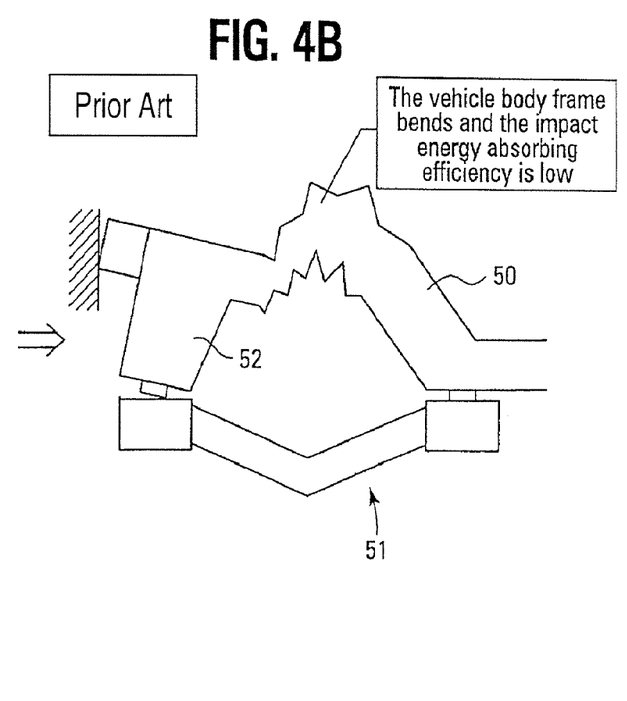

However, for the aforementioned conventional technology of Unexamined Japanese Patent Application Publication No. 2002-160663, as shown in the type diagram for FIG. 4, connecting member 52 that connects sub-frame 51 and vehicle body frame member 50 is rigidly fixed to vehicle body frame member 50 and has a predetermined length in the upper to lower direction of the vehicle. Therefore, when force from the front to rear direction of the vehicle is input to vehicle body frame member 50 upon collision, the rigid center position G of the combined structure of vehicle body frame member 50 and connecting member 52 that receives the impact input is at point G, which is further below the upper to lower direction of the vehicle than the impact input point, as shown in cross section A-A of FIG. 4, so moment A, which is in the center of point G, is applied and moment B operates midway in the lengthwise direction, and as shown in the type diagram for FIG. 4 (b), vehicle body frame member 50 is likely to become deformed in an out-of-plane direction. When it deforms in an out-of-plane direction, the amount of collapsing of vehicle body frame member 50 that occurs in the compression direction (the front to rear direction of the vehicle) decreases and the amount of energy absorbed is smaller.

The present invention was contrived in light of the aforementioned problem and its objective is to improve the energy absorbing efficiency at the vehicle body frame in relation to the impact input to the front to rear direction of the vehicle.

According to the present invention, even for a disposition in which there is a distance in the upper to lower direction between the vehicle body frame and sub-frame, since the deformation mode of the vehicle body frame when a collision occurs from the front to rear direction of the vehicle is predominantly a compression deformation in the front to rear direction of the vehicle, the impact energy can be efficiently absorbed.

Next is provided an explanation of an embodiment of the present invention with reference to the drawings.

Figure 1A:
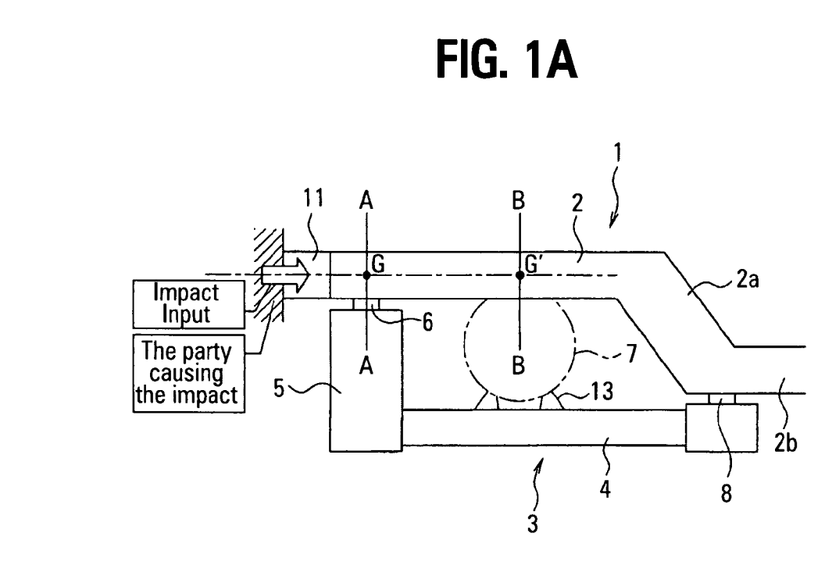

For this embodiment, an explanation is provided of an example of a front-engine vehicle constitution in which the engine is loaded in the front-to-rear direction of the front end of the vehicle. FIG. 1 is a side view of a type diagram of the engine support structure for the present embodiment.

Vehicle body frame 1 comprises a pair of vehicle body front frame side members 2 on the left and right side that extend in the front to rear direction of the vehicle and a plurality of cross frame members (not shown in the drawing) that extend in the horizontal direction of the vehicle and form connections between vehicle body front frame side members 2 on the left and right. Each of aforementioned vehicle body front frame side members 2 bend downward at the portion that leads to the dash panel to form inclined portion 2a, and further to the rear of the vehicle than this inclined portion 2a, is the rear of the front to rear direction of the vehicle, or the bottom of the vehicle body floor consisting of extended side members 2b disposed on both sides of the vehicle. Reference symbol 11 indicates the bumper.

Below aforementioned vehicle body frame 1 on opposite sides, is disposed sub-frame 3 so as to allow for a predetermined distance in the upper to lower direction. Sub-frame 3 is comprised of aforementioned vehicle body front frame side members 2, left and right frame body portions 4, which are on opposite sides in the upper to lower direction of vehicle body front frame side members 2 and which extend in the horizontal direction of the vehicle, and cross sub-members (not shown in the drawing) that form connections between left and right frame body portions 4. The front end and rear end of aforementioned frame body portions 4 of aforementioned sub-frame 3 are elastically supported to aforementioned vehicle body front frame side members 2.

Next is provided an explanation of the elastic support structure.

The front ends of aforementioned vehicle body front frame side members 2 and the front ends of frame body portions 4 are connected via connecting members 5, which extend in the upper to lower direction. The lower parts of connecting members 5 and the front ends of aforementioned frame body portions 4 are combined to form a single unit.

Figure 2:
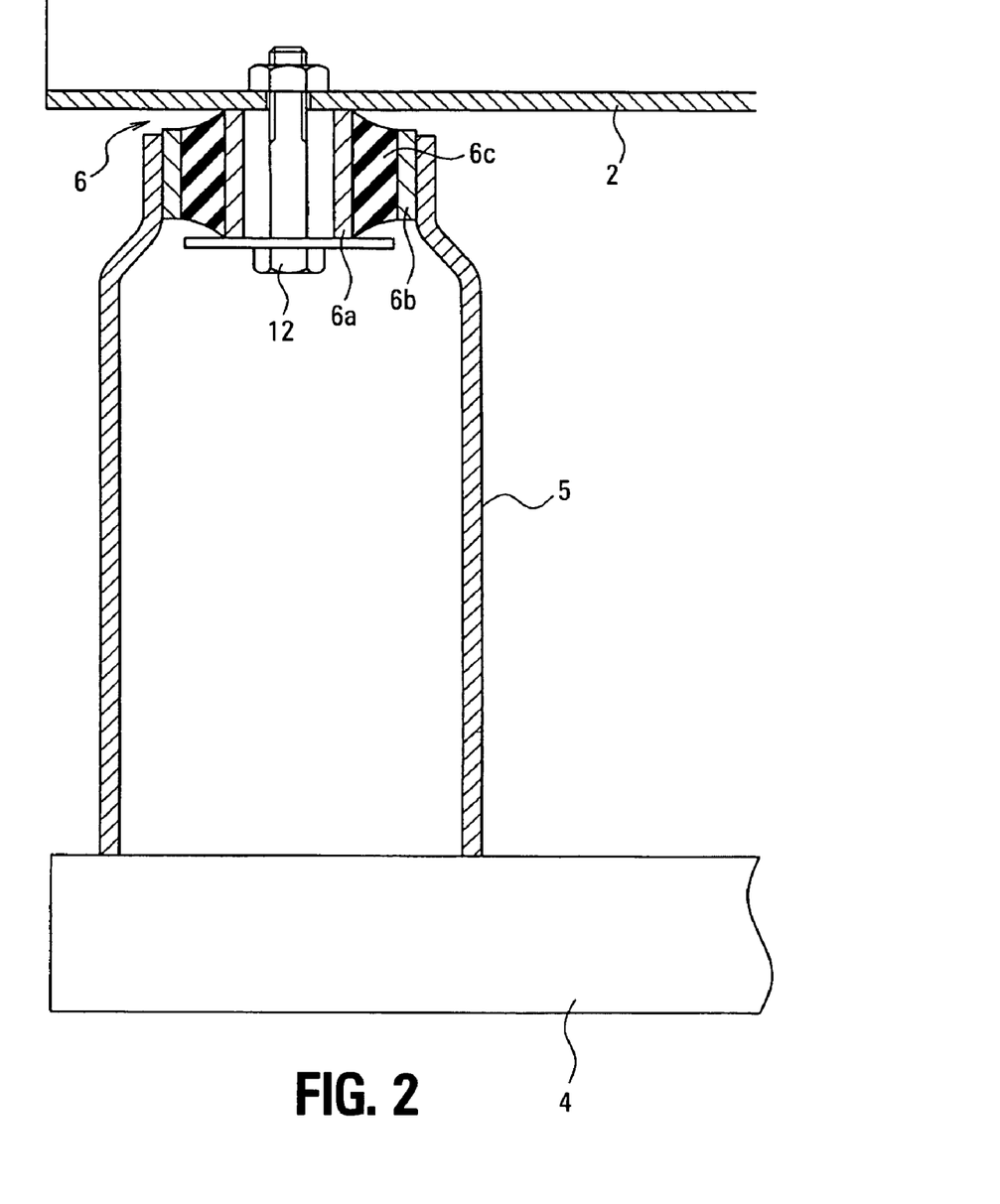
FIG. 2 is a cross section diagram showing the connecting structure for the front frame side members and the sub-members connected via connecting members that pertain to the embodiment of the present invention.

Furthermore, the upper parts of connecting members 5 are connected to the front ends of aforementioned vehicle body front frame side members 2 via aforementioned insulator 6. As shown in FIG. 2, aforementioned insulator 6 consists of elastic body 6c placed between inner tubes 6a and outer tubes 6b disposed on the axis so as to face the top and bottom of said axis. Outer tubes 6b are fixed to the top parts of aforementioned connecting members 5 by pressure insertion, or the like, and inner tubes 6a are fixed to aforementioned vehicle body front frame side members 2 via attachment bolt 12, which penetrates through to the inside of said inner tubes 6a. Here, the length of outer tubes 6b are made shorter than that of inner tubes 6a so that a predetermined gap is formed between the upper ends of outer tubes 6b and the bottoms of vehicle body front frame side members 2.

In addition, the lower ends of frame body portions 4 are elastically supported to the lower position of inclined portion 2a of vehicle body front frame side members 2 via insulator 8, just as was described above.

And then, engine 7 is loaded onto sub-frame 3 via mounting member 13.

Next are provided explanations of the operation and effect of the present embodiment.

For the aforementioned engine support structure, connecting members 5 are connected to sub-frame 3 to form a single unit and thus both 5 and 3 are very rigid. In other words, they are connected so that the restraining force in at least the rotational direction, whose axis is in the horizontal direction of the vehicle, is great. On the other hand, connecting members 5 are connected to vehicle body front frame side members 2 via elastic body 6c so that they are mutually rockable, or in other words, are connected so that the degree of rigidity of the connecting portions is low in order to ensure a small restraining force, or one that is close to zero, in at least the rotational direction, whose axis is in the horizontal direction of the vehicle. Therefore, when input load is applied to vehicle body front frame side members 2 from the front to rear direction of the vehicle, the rigid center position G in the upper to lower direction of the vehicle at the connecting position (position A-A in FIG. 1) of said vehicle body front frame side members 2 and connecting members 5 almost coincides with the cross section center of vehicle body front frame side members 2 and in addition, the rigid center position G' of vehicle body front frame side members 2 in the upper to lower direction of the vehicle at the midway portion in the lengthwise direction (position B-B in FIG. 1) of vehicle body front frame side members 2 also almost coincides with the cross section center of said vehicle body front frame side members 2.

Figure 1B:
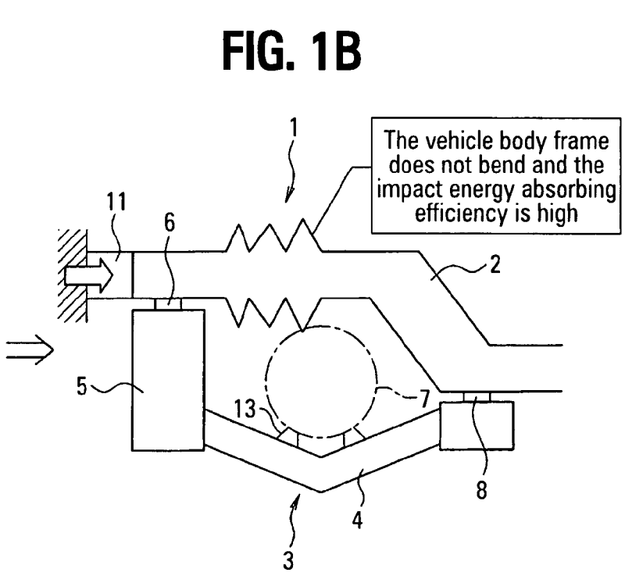

Therefore, when force is applied to vehicle body front frame side members 2 in the front to rear direction of the vehicle upon impact, the moment, which is rigid center position G or G', due to the aforementioned impact input does not occur or is small, so even if there is a distance between vehicle body front frame side members 2 and sub-frame 3, or even if they are connected via connecting members 5, the bending moment applied to vehicle body front frame side members 2 from the reactive force of sub-frame 3 upon impact can be reduced. As a result, the deformation in the compression direction in relation to the input in the front to rear direction of the vehicle upon impact becomes predominant, and as shown in FIG. 1 (*b*), vehicle body front frame side members 2 do not become deformed in an out-of-plane direction, but only collapse in the compression direction, and the amount of energy absorbed increases.

Furthermore, as described above, as vehicle body front frame side members 2 are compressed in the front to rear direction of the vehicle, the upper parts of connecting members 5 incline in the front to rear direction of the vehicle, but since a predetermined gap is formed between the top ends of outer tubes 6*b* that are fixed to connecting members 5 and the bottoms of vehicle body front frame side members 2, the aforementioned restraining force at the portion that connects vehicle body front frame side members 2 and connecting members 5 can be prevented from increasing until the point at which the upper ends of outer tubes 6*b* and vehicle body front frame side members 2 come into contact with one another. In addition, even if the upper ends of outer tubes 6*b* come into contact with vehicle body front frame side members 2 and the restraining force in the aforementioned rotational direction increases, it is still much smaller than the restraining force at the portion that connects connecting members 5 and sub-frame 3, so the input of the bending moment in the upper to lower direction that is input to vehicle body front frame side members 2 is small and deformation in the compression direction has a tendency to remain predominant.

In addition, since both the front end and rear end of sub-frame 3, onto which is mounted engine 7, are elastically supported to vehicle body front frame side members 2 via insulators 6 and 8, vibration of sub-frame 3 due to the vibration of engine 7 is not as easily transmitted to vehicle body front frame side members 2. In other words, the vibration of sub-frame 3, which is added when the vibration of engine 7 gets transmitted, can be prevented from being transmitted to vehicle body front frame side members 2, and noise and vibration performance can also be improved.

In addition, for the aforementioned embodiment, elastic body 6*c* is inserted between 2 and 5 so that they are connected in such a manner as to allow for their mutual rockability, but the restraining force in the rotational direction, whose axis is in the horizontal direction of the vehicle, of the portion that connects connecting members 5 and vehicle body front frame side members 2 is lowered, so [the present invention] is not limited to such a connection. So, for example, by performing the connection using a pin joint or universal joint whose axis faces the horizontal direction of the vehicle, the restraining force in at least the rotational direction and whose axis is in the horizontal direction, can either be reduced or set at zero.

Figure 3:
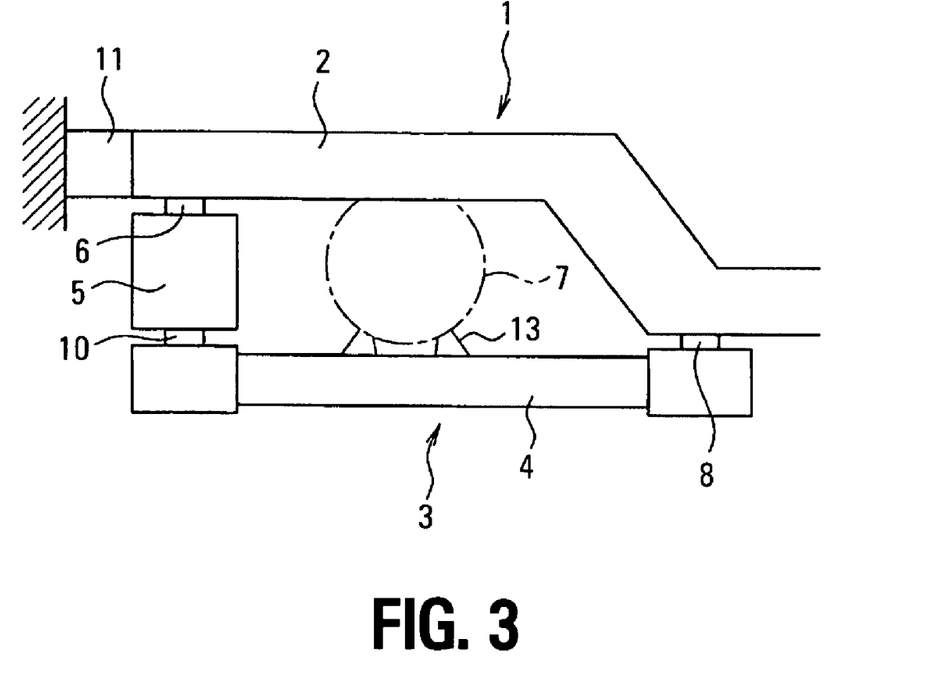
FIG. 3 shows another engine support structure that pertains to the embodiment of the present invention.

Also for the aforementioned embodiment, although connecting members 5 and sub-frame 3 are connected to form a single unit, as shown in FIG. 3, connecting members 5 and sub-frame 3 can also be connected via elastic body 10. In this case, the rigidity of elastic body 10 that connects connecting members 5 and sub-frame 3 is made to be greater than the rigidity of elastic body 6*c* placed between aforementioned vehicle body front frame side members 2 and connecting members 5. Thus, the aforementioned effect and be maintained while at the same time making it more difficult for the vibration from sub-frame 3 to get transmitted even further to vehicle body front frame side members 2.

In addition, for the aforementioned embodiment, an example was provided in which the present invention was applied to a front engine vehicle constitution, but it can also be applied to a rear engine vehicle constitution and the same effect can be achieved when a collision occurs from the rear direction of the vehicle.

In addition, for the aforementioned embodiment, an example was provided in which the present invention was applied to a vehicle constitution in which a sub-frame supports the engine, but the same effects can be achieved by applying the present invention to a vehicle constitution in which a sub-frame that does not support the engine is provided, such as a sub-frame that supports the transmission or suspension arm that is positioned at the rear-wheel end of a front engine vehicle or a sub-frame that supports the transmission or suspension arm that is positioned at the front-wheel end of a read engine vehicle.

There were also problems as described below regarding the aforementioned conventional technology of Unexamined Japanese Patent Application Publication No. 2003-246276. First of all, the bolt had to be long enough to securely tighten the insulator and spacer that were disposed so that they overlapped in the upper to lower direction with one another, so there was a concern that they could not be tightened securely because the bolt would collapse. In addition, the constitution was one in which a stopper was disposed below the sub-frame to prevent it from falling out, resulting in lower above-ground height in order to account for the space taken up by the stopper, so if the above-ground height were too low, the stopper could not be used in order to avoid interference with the road surface.

The present invention was contrived in light of these problems and its objective is to prevent insecure tightening and provide an automobile suspension device that can easily be applied to various types of automobiles.

In order to solve the aforementioned problems, the automobile suspension device for the present invention is a suspension device that has a sub-frame disposed below a vehicle body side member, wherein said vehicle body side member and said sub-frame are connected by means of a support member that extends in the upper to lower direction; and said support member is provided with a tubular member that is connected to the aforementioned sub-frame and extends upward and a supporting elastic body that is inserted into the upper part of said tubular member and whose up and down length is shorter than said tubular member; and wherein said supporting elastic body is securely tightened to the vehicle body side member by a bolt that penetrates up and down through said supporting elastic body.

According to the present invention, the bolt can be shortened, so there is no risk of insecure tightening due to the collapse of the bolt. In addition, the present invention can be applied to various types of automobiles.

Next is provided an explanation of an embodiment of the present invention with reference to the drawings.

Figure 5:
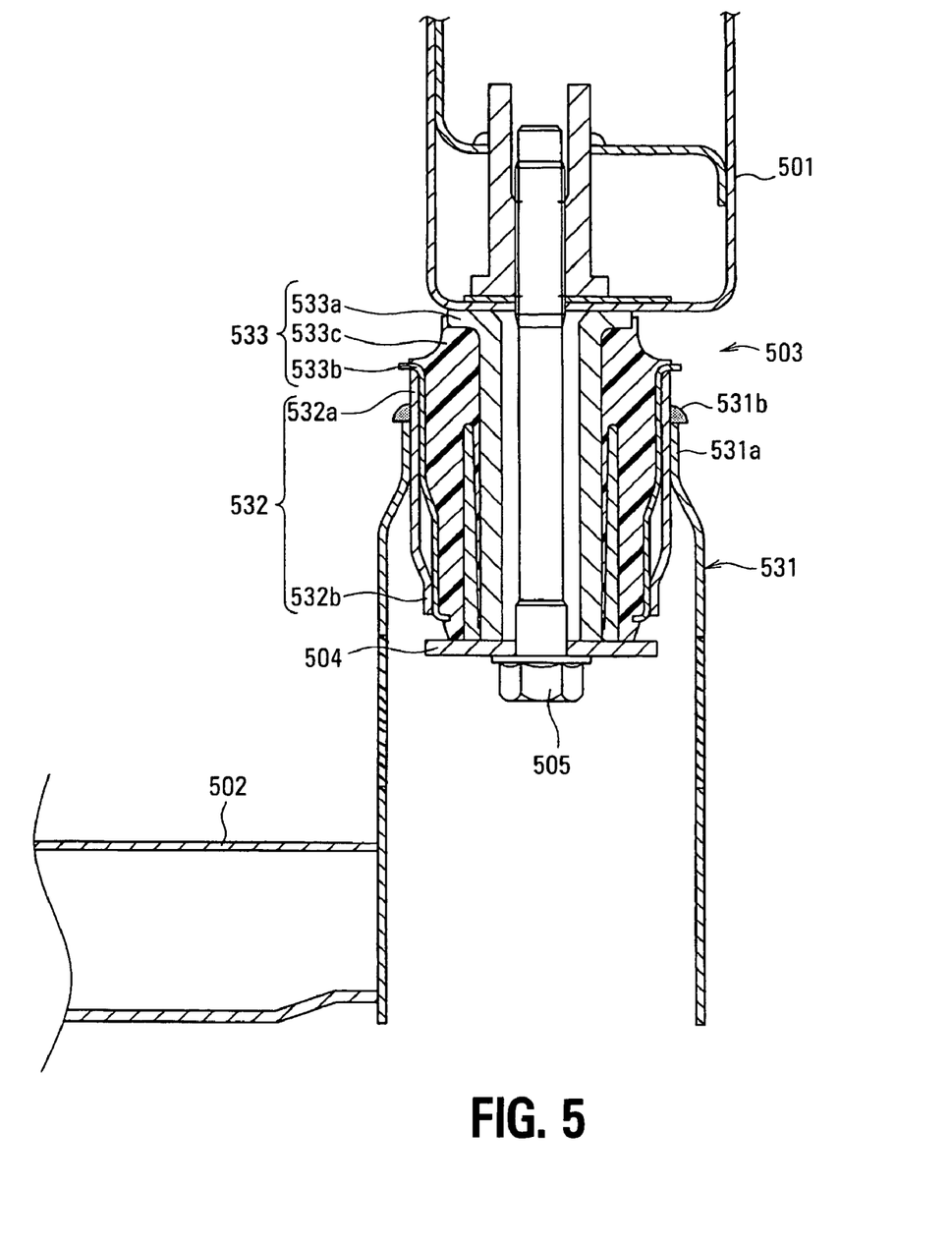
FIG. 5 is a cross section diagram showing an embodiment of the present invention.

FIG. 5 is a cross section diagram showing the structure of the suspension device for an automobile pertaining to the present embodiment.

Sub-frame 502 is disposed below vehicle body side member 501 and this vehicle body side member 501 and sub-frame 502 are connected via support member 503, which extends in the upper to lower direction. Thus, sub-frame 502 is elastically supported to vehicle body side member 501 via support member 503.

Support member 503 is provided with outer tubular member 531, inner tubular member 532 and insulator 533.

Outer tubular member 531 is an approximately cylindrical member that extends upward and downward and its top part is squeezed to form small diameter portion 531*a*. The lower part of outer tubular portion 531 is welded to sub-frame 502 to form a single unit that extends upward and downward, and inner tubular member 532 is mated into aforementioned small diameter portion 531a. The outer diameter of the portion that is lower than small diameter portion 531a is larger than small diameter portion 531a to prevent contact with stopper 504, which is described below.

This outer tubular member 531 corresponds with the tubular member for the present invention.

Inner tubular member 532 is an approximately cylindrical member with its axis facing up and down and is comprised of mated portion 532a that has approximately the same outer diameter as the inner diameter of outer tubular member 531 and hanging portion 532b that is formed in succession below mated portion 532a and that has a smaller outer diameter than mated portion 532a. As described above, mated portion 532a is mated to outer tubular member 531. In addition, inner tubular member 532 is mated to insulator 533 inside its inner circumference. The upward to downward length of mated portion 532a is longer than the upward to downward length of small diameter portion 531a of outer tubular member 531, which is mated to the outside of said mated portion. When inner tubular member 532 is installed to outer tubular member 531, mated portion 532a is pressed into position in an upward to downward direction so that it mates in a position that corresponds to a vehicle in which small diameter portion 531a is applied. In this manner, the up and down length of support member 503 is adjusted. After it is pressed into position, it is welded into place in this position. Reference symbol 531b shown in the drawing is the welded portion.

Insulator 533 is provided with bush inner tube 533a whose axis faces up and down, bush outer tube 533b that is disposed on the same axis as bush inner tube 533a, and rubber member 533c that is inserted between bush inner tube 533a and bush outer tube 533b. This insulator 533 is shorter overall in the up and down direction than outer tubular member 531. Furthermore, as described above, bush outer tube 533b is mated to inner tubular member 532. In addition, bolt 505 passes through the hollow portion of bush inner tube 533a from the bottom and the head of bolt 505 abuts the lower end of insulator 533 via a washer and said insulator 533 is securely tightened to vehicle body side member 501. In this manner, support member 503 is entirely tightened to vehicle body member 501 by bolt 505.

When vibration is transmitted from sub-frame 502, bush outer tube 533b, which is shorter in the up and down direction than bush inner tube 533a, vibrates, but this vibration is reduced by rubber member 533c and is barely transmitted to bush inner tube 533a or vehicle body side member 501 at all. In addition, the upper end of bush outer tube 533b is bent outward and pressed in when assembled until it comes into contact with the upper end of inner tubular member 532.

In addition, the washer used for tightening bolt 505 corresponds to the stopper 504 for the present invention, is larger than the outer diameter of the lower end of insulator 533, and is slightly smaller than or the same size as the outer diameter of hanging portion 532b of inner tubular member 532. Insulator 533 and inner tubular member 532 are disposed on the same axis as stopper 504 so insulator 533 and hanging portion 532b both face stopper 504 in the upper to lower direction.

Next is provided an explanation of the operational effect achieved by support member 503 that has the aforementioned constitution.

First, for the aforementioned constitution, insulator 533 is installed inside of the hollow portion of outer tubular member 531 to serve the purpose of a conventional spacer, and insulator 533 is tightened securely to vehicle body side member 501 with bolt 505. Thus, bolt 505 can be shortened to suppress the occurrence of insecure tightening due to the collapse of the bolt.

In addition, for the aforementioned constitution, insulator 533 and hanging portion 532b of inner tubular member 532 both face stopper 504 in the upper to lower direction. Therefore, if insulator 533 breaks due to the deterioration of rubber member 533c over time and falls out together with inner tubular member 532 to whose outside is mated bush outer tube 533b, and inner tubular member 532 falls out of insulator 533, stopper 504 will catch insulator 533 and hanging portion 532b and prevent sub-frame 502 from falling out.

Furthermore, for the aforementioned constitution, stopper 504 is contained inside of the hollow portion of outer tubular member 531. Therefore, even if a stopper is installed, the above-ground height will not become so low that the structure interferes with the road surface and the aforementioned constitution can be applied for types of automobiles for which it previously could not.

In addition, for the aforementioned constitution, the outer diameter of hanging portion 532b is reduced in size compared to mated portion 532a of inner tubular member 532 and the outer diameter of stopper 504 is made to be the same as this diameter. Thus, by making the diameter of stopper 504 as small as possible, the outer diameter of the lower part is made smaller than small diameter portion 531a of outer tubular member 531, therefore making it easier to apply the aforementioned constitution to many different types of automobiles. Also, when the difference in the outer diameter of the lower portion and small diameter portion 531a is great and they are squeezed tightly, the difficulty in manufacturing increases as well as the manufacturing cost, but if the difference in the outer diameter is reduced, as in the aforementioned constitution, this problem is eliminated.

Moreover, for the aforementioned constitution, by making the length of mated portion 532a of inner tubular member 532 in the upper to lower direction longer than small diameter portion 531a of outer tubular member 531, which mates into this, the installation position can be arbitrarily selected in the upper to lower direction and the length of support member 503 in the upper to lower direction can be adjusted. Therefore, the same support member 503 can be used for various types of automobiles with different spaces formed between vehicle body side member 501 and sub-frame 502. Or, by simply adjusting the length of support member 3, the form of the vehicle can be easily changed.

Needless to say, the present invention is not limited to the aforementioned constitution.

Figure 6:
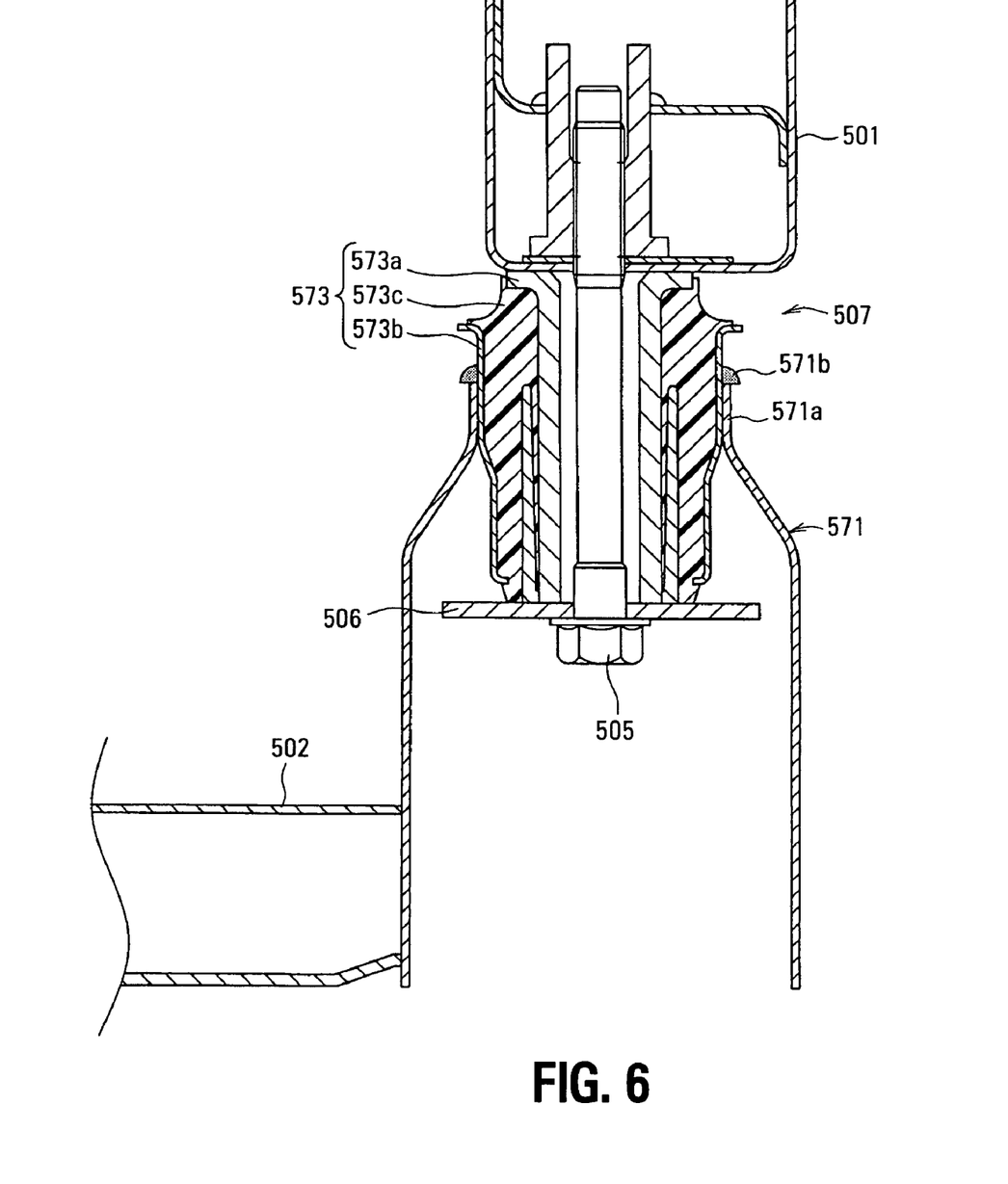
FIG. 6 is a cross section diagram showing a different embodiment of the present invention than that in FIG. 5.

The constitution shown in FIG. 6, for example, can also be used. Next is provided an explanation of the differences between this constitution and the constitution shown in FIG. 5.

For the constitution in FIG. 6, the constitution of the support member is somewhat different than that shown in FIG. 5. In FIG. 6, support member 507 is provided with tubular member 571 and insulator 573, but the tubular member is not a double structure consisting of an outer tubular member and an inner tubular member such as that shown in FIG. 5. Tubular member 571 has small diameter portion 571a at its upper end and into this is mated insulator 573. Insulator 573 is provided with bush outer tube 573b, bush inner tube 573a, and rubber member 573c, which connects them, just as is shown in FIG. 5, but the difference is that bush outer tube 573b is mated directly to tubular member 571. Therefore, the length in the upper to lower direction of the portion of bush outer tube 573b that mates with tubular member 571 is longer than small diameter portion 571a of tubular member 571, allowing for adjustment of the installation position in the upper to lower direction. In addition, a washer serves as stopper 506, as was the case in FIG. 5. However, in this constitution, since a separate member is not disposed, the outer diameter of stopper 506 is made larger in size than the inner diameter of said small diameter portion 571*a* so that it can catch small diameter portion 571*a* of the tubular member. In this drawing, reference symbol 571*b* is the welded portion.

Also for the constitution in FIG. 6, bolt 505 can be reduced in length, so there is no risk of insecure tightening. In addition, since stopper 506 is disposed inside of the hollow portion of tubular member 571, the above-ground height will not be too low due to the placement of stopper 506.

Moreover, although not shown in the drawing, the separate member that constitutes the hanging portion is not limited to inner tubular member 532, as described above, and one end could be attached to outer tubular member 531 and the other end could overhang to face the inside of the outer tubular member opposite from the stopper. However, if a constitution is used in which inner tubular member 532 is provided, it is mated with both insulator 533 and outer tubular member 531, so there is no risk of the separate member falling out, making it easier to manufacture even from the standpoint of form. In addition, a constitution whereby the length of support member 503 can be changed can also be used.

EXPLANATION OF THE REFERENCE SYMBOLS

| | |
|---|---|
| 1 | Vehicle body frame |
| 2 | Vehicle body front frame side member (extended portion) |
| 3 | Sub-frame |
| 4 | Frame body portion |
| 5 | Connecting member |
| 6 | Insulator |
| 6a | Inner tube |
| 6b | Outer tube |
| 6c | Elastic body |
| 7 | Engine |
| 10 | Elastic body |
| 12 | Attachment bolt |
| 501 | Vehicle body side member |
| 502 | Sub-frame |
| 503, 507 | Support members |
| 504, 506 | Stoppers |
| 505 | Bolt |
| 531 | Outer tubular member |
| 531a | Small diameter portion |
| 531b, 571b | Welded portions |
| 532 | Inner tubular member |
| 532a | Mated portion |
| 532b | Hanging portion |
| 533, 573 | Insulators |
| 533a, 573a | Bush inner tubes |
| 533b, 573b | Bush outer tubes |
| 533c, 573c | Rubber members |
| 571 | Tubular member |
| 571a | Small diameter portion |

What is claimed is:

1. A connecting structure comprising:
a sub-frame extending horizontally in a front to rear direction of a vehicle having the connecting structure;
a vehicle body frame connected to the sub-frame and extending horizontally in the front to rear direction of the vehicle, the sub-frame and the vehicle body frame being vertically spaced apart;
a connecting member having an upper end and a lower end with a longitudinal axis extending therebetween; and
an insulator attaching the upper end of the connecting member to the vehicle body frame, the insulator including
an outer tube disposed on the longitudinal axis and fixed to the upper end of the connecting member,
an inner tube disposed on the longitudinal axis of the connecting member and fixed to the vehicle body frame by a bolt extending through the inner tube, and
an elastic body elastically coupling the inner and outer tubes so as to allow for mutual rockability between the vehicle body frame and the connecting member, such that a restraining force in a rotational direction is smaller at the upper end than at the lower end, the inner tube, the outer tube and the elastic body extending along the longitudinal axis of the connecting member,
the sub-frame being connected to the connecting member at a location disposed completely below a bottom end of the insulator.

2. The connecting structure of claim 1, wherein
the upper end of the connecting member and an upper end of the outer tube are vertically spaced apart from the vehicle body frame by a vertical gap.

3. The connecting structure of claim 1, wherein
the sub-frame and connecting member are fixed so as to form a single unit.

4. The connecting structure of claim 1, wherein
a longitudinal length of the insulator is shorter than a longitudinal length of the connecting member, and the rotational direction is substantially perpendicular to the longitudinal axis.

5. A connecting structure comprising:
a sub-frame extending horizontally in a front to rear direction of a vehicle having the connecting structure;
a vehicle body frame connected to the sub-frame and extending horizontally above the sub-frame in the front to rear direction of the vehicle such that the sub-frame and the vehicle body frame are vertically spaced apart;
a connecting member extending in a vertical direction between the sub-frame and the vehicle body frame, the connecting member being a tubular member connected to the sub-frame; and
a supporting elastic body disposed inside an upper end of the connecting member, the supporting elastic body having a longitudinal length that is shorter than a longitudinal length of the connecting member, the supporting elastic body being securely tightened to the vehicle body frame by a bolt that extends through the supporting elastic body in the vertical direction,
the connecting structure being coupled to the vehicle body frame by the supporting elastic body such that a restraining force in a rotational direction about a rotational axis extending in a horizontal direction of the vehicle is, smaller at a portion that connects the vehicle body frame and the connecting member than at a portion that connects the sub-frame and the connecting member,
the sub-frame being connected to the connecting member at a location disposed completely below the supporting elastic body.

6. The connecting structure of claim 5, wherein
the supporting elastic body is part of an insulator that includes an inner tube and an outer tube with the supporting elastic body disposed between the inner and outer tubes, with one of the inner and outer tubes being fixed to the vehicle body frame and the other one of the inner and outer tubes being fixed to a top of the connecting member.

7. The connecting structure of claim 6, wherein
the bolt extends through the inner tube to fix the inner tube to the vehicle body frame, and
the outer tube is affixed to the top of the connecting member.

8. The connecting structure of claim 7, wherein
the upper end of the connecting member and an upper end of the outer tube are vertically spaced apart from the vehicle body frame by a vertical gap.

9. The connecting structure of claim 5, wherein
the sub-frame and the connecting member are fixed so as to form a single unit.

10. The connecting structure of claim 5, wherein the sub-frame supports an engine.

11. A connecting structure comprising:
a sub-frame extending horizontally in a front to rear direction of a vehicle having the connecting structure;
a vehicle body frame connected to the sub-frame and extending horizontally in the front to rear direction of the vehicle, the sub-frame and the vehicle body frame being vertically spaced apart;
a connecting member extending in a vertical direction between the sub-frame and the vehicle body frame, the connecting member including a first tubular member connected to the sub-frame and a second tubular member telescopically disposed within the first tubular member;
a supporting elastic body disposed inside an upper end of the second tubular member, the supporting elastic body having a longitudinal length that is shorter than the first tubular member;
a bolt extending in the vertical direction through the supporting elastic body to secure the supporting elastic body to the vehicle body frame; and
a stopper supported by the bolt and disposed inside a hollow portion of the first tubular member, the stopper and the second tubular member being arranged with respect to each other such that the stopper prevents the second tubular member from moving downwardly past the stopper,
with the sub-frame being connected to the connecting member at a location completely below the supporting elastic body.

12. The connecting structure of claim 11, wherein
the second tubular member has a lower end that faces the stopper in the vertical direction, with the second tubular member being attached to an inner surface of the first tubular member.

13. The connecting structure of claim 12, wherein
an upper end of the second tubular member is mated to the inner surface of an upper part of the first tubular member, and the second tubular member is mated to an outer surface of the supporting elastic body.

14. The connecting structure of claim 13, wherein
the lower end of the second tubular member is spaced radially inward from the first tubular member with an annular gap surrounding the lower end of the second tubular member.

15. The connecting structure of claim 13, wherein
the first and second tubular members are telescopically arranged such that the second tubular member can slide within the first tubular member to change a relative position of the second tubular member within the first tubular member before fixing the first and second tubular members together.

16. The connecting structure of claim 14, wherein
the first and second tubular members are telescopically arranged such that the second tubular member can slide within the first tubular member to change a relative position of the second tubular member within the first tubular member before fixing the first and second tubular members together.

17. A method comprising:
connecting a lower end of a connecting member to a sub-frame;
connecting an upper end of the connecting member to a vehicle body via an insulator such that the sub-frame and the vehicle body frame extend horizontally in a front to rear direction of the vehicle, with the sub-frame and the vehicle body frame being vertically spaced apart, with the sub-frame being connected to the connecting member at a location completely below the insulator,
the insulator being connected by fixing an inner tube of the insulator to the vehicle body frame using a bolt that extends through the inner tube, and fixing an outer tube of the insulator to an upper end of the connecting member, with an elastic body of the insulator elastically coupling the inner and outer tubes to allow for mutual rockability such that a restraining force in a rotational direction is smaller at a portion that connects the vehicle body frame and the connecting member than at a portion that connects the sub-frame and the connecting member.

18. The method of claim 17, wherein
the fixing of the inner tube of the insulator to the vehicle body frame includes forming a vertical gap between the vehicle body frame and the upper end of the connecting member and an upper end of the outer tube.

19. The method of claim 17, wherein the sub-frame and connecting member are fixed so as to form a single unit.

* * * * *